United States Patent [19]

Lochridge

[11] 4,074,541
[45] Feb. 21, 1978

[54] METHOD OF INSTALLING A FLEXIBLE RISER

[75] Inventor: Joe Cooper Lochridge, Houston, Tex.

[73] Assignee: Brown & Root, Inc., Houston, Tex.

[21] Appl. No.: 812,822

[22] Filed: July 5, 1977

[51] Int. Cl.² .............................................. F16L 1/04
[52] U.S. Cl. .......................................... 61/110; 61/86
[58] Field of Search ................... 61/86, 105, 107, 110, 61/111, 114; 166/0.5, 0.6

[56] References Cited

U.S. PATENT DOCUMENTS

| | | | |
|---|---|---|---|
| 3,219,119 | 11/1965 | Matthews | 61/110 X |
| 3,376,708 | 4/1968 | Hindman | 61/110 |
| 3,546,889 | 12/1970 | Hemphill et al. | 61/86 X |
| 4,031,919 | 6/1977 | Ortloff et al. | 61/86 X |

*Primary Examiner*—Robert L. Wolfe
*Assistant Examiner*—David H. Corbin

*Attorney, Agent, or Firm*—Kenway & Jenney

[57] ABSTRACT

A method of installing a riser to provide a continuous flow path from a relatively rigid pipeline lying on the bottom of a body of water to an above water connection on an offshore apparatus is disclosed. The riser according to one aspect of the invention is a tubular flexible conduit and in a second aspect is a rigid member connected to the pipeline by a flexible section. The method of the invention for installing the riser uses available equipment, relatively small lifting forces and avoids the deformation of rigid pipe. In one particular embodiment, the pipeline-riser combination is laid on the bottom of the body of water and according to the method, the riser member is thereafter raised to a vertical orientation with respect to the offshore platform. The method provides a riser which does not undergo deformation at the bending zone wherein fluid flow changes between the horizontal and vertical directions.

8 Claims, 5 Drawing Figures

METHOD OF INSTALLING A FLEXIBLE RISER

This invention relates to the production and storage of oil offshore and in particular to a method of installing the riser portion of an offshore apparatus for transmitting oil to and from operating platforms of the apparatus.

BACKGROUND OF THE INVENTION

The provision of flowlines to transport fluids to and from the above water work areas of offshore apparatus has been the subject of study for many years. The continued growth of the offshore drilling industry and their ventures into areas having more severe environmental conditions, for example, greater water depths and more severe weather conditions, such as the North Sea, has provided great impetus to find better, safer, and less costly methods of an apparatus for offshore operations.

One particular interest is the diminution of the diver assisted underwater welding operations. Diver assistance is time consuming and expensive especially at depths of 200 feet or more where movement is difficult and the amount of underwater time per dive is small. Hence any underwater operation should preferably be of minimum complexity, and preferably requires as little diver assistance as possible; otherwise, the time and expense in setting up an offshore facility quickly becomes overburdening.

Another field of interest is the reduction of capital expenditures for special equipment, for example, equipment having unusually high bending or pulling requirements, such as is used to bend pipelines in a specified manner. This equipment may be used infrequently and hence the cost per use may be relatively high.

This invention is directed to the riser portion of an offshore apparatus and in particular to a method of installing it after laying the pipeline, that is, in a laying in situation. The riser is the means by which fluids are received or discharged from the above water facilities of the apparatus. Typically, fluids may be received using a riser connection from underwater storage and/or production facilities; or fluids may be discharged from the platform through the riser to a pipeline for transport to onshore storage or production facilities. Typically, the riser is connected to a fluid processing or distribution network on the above water portion of the offshore apparatus, and at its other submersed end, to a pipeline at a connection or coupling means near the base of the apparatus on the bottom of the body of water.

Many different techniques and apparatus have been suggested in the art for coupling the riser to the pipeline. These techniques generally provide either for mechanically bending the riser pipe, which may be a continuation of the pipeline, to make an approximately 90° change in direction from horizontal to vertical or for using a preformed riser section having a substantially 90° bend. In the latter case, the riser section is then coupled or secured in a fluid-tight connection to the pipeline. In any instance, the requirement of bending the riser to change the orientation of fluid flow from a horizontal to a substantially vertical direction (or vice versa) is a mechanically difficult (special equipment having very large, controlled bending forces are required) and time consuming operation entailing relatively large costs.

Another approach has been suggested (Matthews, Jr., U.S. Pat. No. 3,219,119, issued Nov. 23, 1965) for providing means for coupling the riser to the pipeline using a flexible coupling or flexible joint between the rigid pipeline and the riser member. However, this arrangement involves the installation of the riser on the jacket before the pipeline is laid.

An object of the invention is therefore a method of providing a pipeline-riser installation which is relatively inexpensive and simple to install, which is reliable in operation, which permits riser installation after a pipeline is laid, and which can be installed at great depths with a minimum of diver interaction. Other objects of the invention include a method of providing a pipeline-riser installation in which large bending forces and specialized equipment are not required, and in which deformation of a rigid pipeline is avoided.

SUMMARY OF THE INVENTION

The invention relates to a method for providing a continuous fluid flow path from a relatively rigid pipe lying along the bottom of a body of water to an above water connection on an offshore apparatus. The method features the steps of laying the pipeline along the bottom of the body of water toward the offshore apparatus from a pipelaying vessel and terminating the pipeline at a point which is sufficient to reach approximately to the base of the offshore apparatus. At the terminated end of the pipeline, a flexible tubular pipeline member, which has sufficient strength to withstand the normal operating flow path conditions, is connected to the pipeline. A predetermind length of the flexible member is then payed out, the length being at least sufficient to reach from a known connection point on the apparatus to the connection point on the bottom of the body of water. The flexible member is thus connected to and provides an extension of the pipeline. Thereafter, the flexible member can be drawn and secured to the offshore apparatus to provide a continuous flow path between the above water portion of the apparatus and the pipeline. The free end of the flexible member is connected to the connection point on the apparatus.

In a particular embodiment of the method, the flexible member is secured in a substantially vertical orientation to the offshore apparatus.

In another aspect of the invention, the method features terminating the flexible member at a length sufficient to provide a bending zone from a horizontal to a vertical direction, connecting to the flexible member a rigid member, continuing to lay the rigid member, and terminating the rigid member at a length at least sufficient to reach the above water connection on the apparatus.

In yet another aspect, the method features the steps of orienting the rigid member in a vertical direction and substituting a preformed rigid pipeline member for the flexible member.

DESCRIPTION OF THE DRAWINGS

Other objects, features and advantages of the invention will appear from the following description of particular preferred embodiments of the invention taken together with the drawings in which.

DESCRIPTION OF PREFERRED EMBODIMENTS

Figure 1:
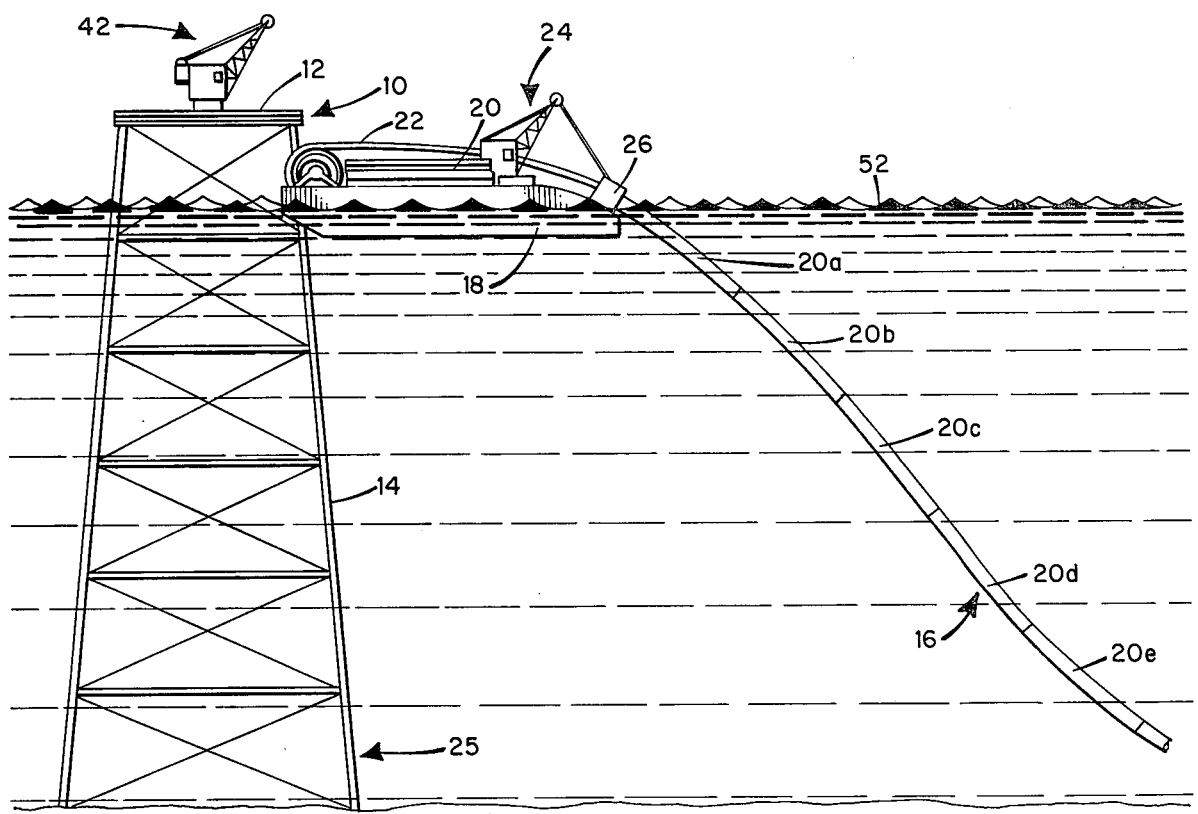
FIG. 1 is a diagrammatic elevation representation of the first steps in practicing the method of the invention.

Referring to FIG. 1, an offshore apparatus 10, for example one associated with the exploration or production of oil at an offshore location, is illustrated schematically and may comprise a platform 14 supporting petroleum production, processing, or storage equipment.

This invention is directed to a method of installing a riser for providing a continuous, generally upright fluid flow path from a pipeline 16 which lies on the bottom of a body of water to a connection point on the upper portion 12 of platform 14. (Typically, the connection flowline between the offshore apparatus and the pipeline 16 is referred to as the riser.)

In accordance with the invention, the pipeline 16 is laid in toward the offshore apparatus from a pipelaying vessel 18, for example, from an onshore processing facility. Pipelaying vessel 18, typically a barge, has on board a plurality of pipeline sections 20, a supply of a flexible pipeline member 22, a crane or derrick 24 and the necessary apparatus for connecting, moving, and cutting the pipeline sections 20, for connecting flexible pipeline member 22 to pipeline sections 20, and for cutting member 22. The continuous pipeline, composed of connected sections 20a, 20b, 20c ... is payed out from the vessel 18 along a flow path. Depending upon the depth of the body of water, one or more flowline path defining members (not shown), for example the articulated stinger arrangement of Rochelle et al., U.S. Pat. No. 3,507,126, issued Apr. 21, 1970, may be used to place the pipeline safely on the bottom of the body of water.

Figure 2:
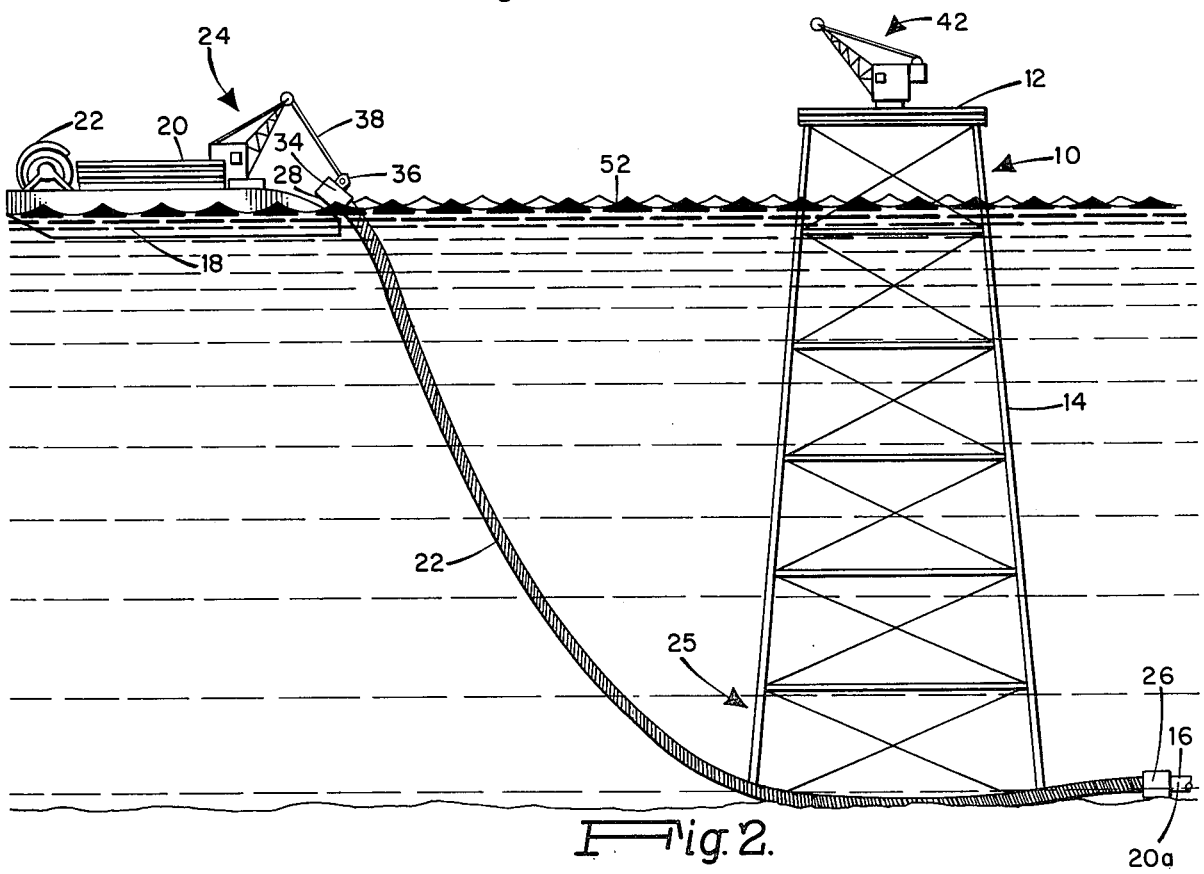
FIG. 2 is a diagrammatic elevation representation of the next steps in practicing the method of the invention.

Referring to FIG. 1, according to the invention, pipeline sections 20 are joined together, for example by welding, until a sufficient length of pipe has been joined to reach the vicinity of the base 25 of offshore apparatus 10. Prior to paying out the last pipe section 20a from pipelaying vessel 18, a free end of flexible pipeline member 22 is joined to the last pipe section 20a of pipeline 16 in a fluid-tight connection 26. Flexible pipeline member 22 is a high-strength tubular pipeline which can be flexed or bent to a substantial amount without buckling and without suffering plastic deformation and which is capable of making relatively sharp bends without requiring the high bending pressures needed to bend relatively rigid pipeline 16. Flexible pipeline member 22, after being joined to pipeline section 22a, is payed out from pipelaying vessel 18 as were the connected pipeline sections (FIG. 2). A predetermined length of the flexible pipeline member 22 is payed out, a length, in this preferred embodiment, approximately equal to the height of the upper portion 12 above the water bottom. In general, the length is approximately equal to the height of the connection point on the apparatus above the water bottom. The exact length which is payed out also depends upon the location of fluid-tight connection 26 relative to the base 25 of apparatus 10 and the allowable radius of curvature of flexible pipeline member 22. In any event, the length is sufficient so that a terminated free end 28 (FIG. 2) of flexible member 22 may be later connected to the offshore apparatus, preferably while maintaining the pipeline 16 and connection 26 on the bottom of the body of water (See FIG. 4).

On board the pipelaying vessel, the length of the flexible member is cumulatively measured as it is payed out and when the predetermined length is measured, the member 22 is cut leaving the terminated free end 28 of flexible member 22. A plug 34 and a connection device, for example a padeye 36, are then provided at the free end. Plug 34 protects the flowline consisting of pipeline member 22 and pipeline 16 by preventing the ingress of water to the interior of the continuous flowline. Padeye 36 is connected to free end 28 to provide a connection point whereby a cable can be suitably attached to the free end of pipeline member 22.

Thereafter, according to one embodiment of the invention, a cable 38 is attached to the free end of member 22 at the padeye of the flexible pipeline member is lowered to the bottom of the body of water by cable 38. The movement of cable 38 is controlled by the operation of a crane 24 on the pipelaying vessel.

Figure 3:
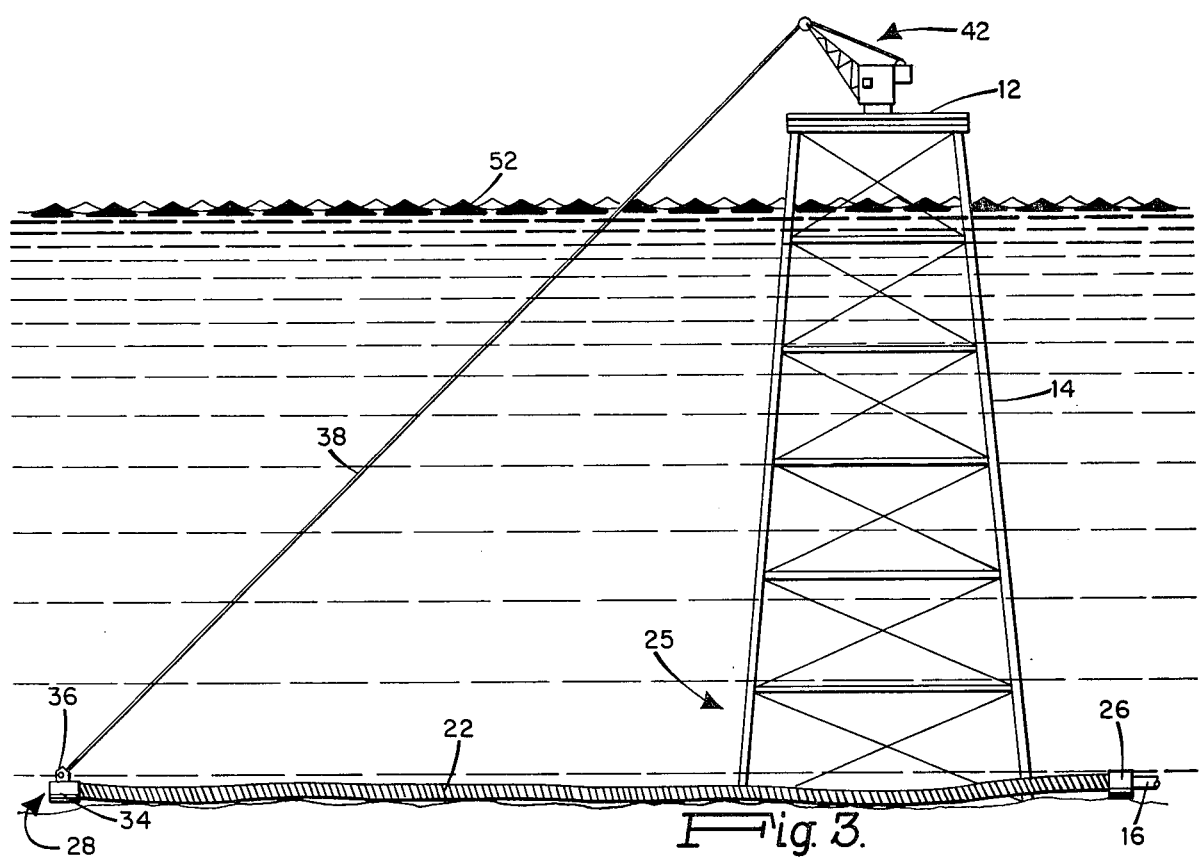
FIG. 3 is a perspective view of the pipeline-riser combination just prior to raising the riser portion to a vertical orientation according to one embodiment of the invention.

Referring to FIG. 3, the flexible pipeline member 22 and pipeline 16 are shown positioned on the bottom of the body of water. Cable 38, which was used by the pipelaying vessel to lower member 22, has now been transferred to a crane 42 on the upper portion 12 of offshore apparatus 10. Crane 42 provides the lifting force to raise flexible pipeline member 22 to a vertical orientation adjacent apparatus 10. The manner in which a cable is attached to the free end of flexible member 22 to provide the lifting force needed to reorient the flexible member is a matter of convenience.

While a preferred method and apparatus to lower and then raise flexible member 22 have been described, other methods and apparatus could also be used. For example, flexible member 22 could have been placed on the bottom of the body of water in a standard manner using an articulated stinger and thereafter a diver could attach a lifting cable from crane 42 to the free end of the flexible member, or in an alternate embodiment of the invention, the free end of member 22 is connected or secured to the offshore platform without laying the flexible member on the bottom of the body of water.

Figure 4:
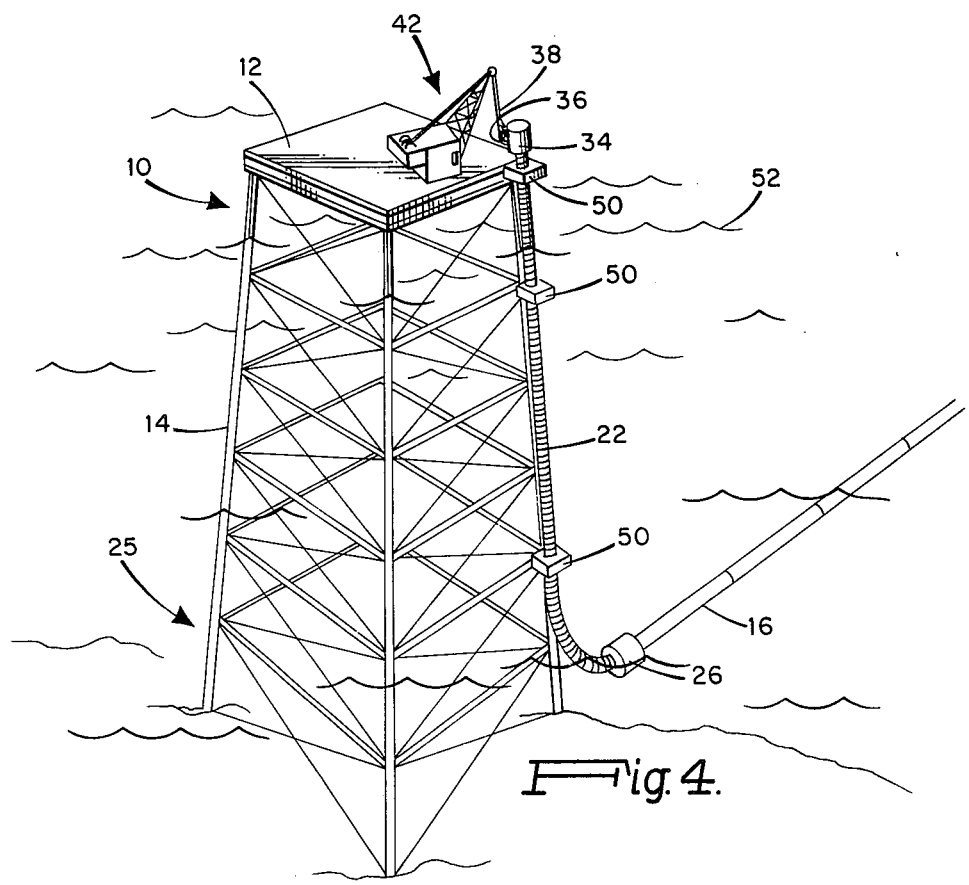
FIG. 4 is a diagrammatic elevation representation of the pipeline-riser combination according to the invention with the flexible pipeline member secured, in position, to the offshore apparatus.

Referring to FIG. 4, flexible pipeline member 22 has been raised to a substantially vertical orientation and in the preferred embodiment is secured to the offshore apparatus 10 by securing clamps 50. Flexible member 22 as noted above has sufficient length so that its free end 28 is above the water surface 52 of the body of water.

Flexible pipeline member 22 is chosen to be sufficiently flexible so that it can be raised to a substantially vertical orientation without requiring high bending forces. While flexible pipeline member 22 may be of any suitable type having sufficient strength and flexibility characteristics, a preferred flexible pipeline is that manufactured by Coflexip. Coflexip manufactures the flexible pipeline in France and has offices in several U.S. cities, including Houston, Tex. This particular flexible pipeline member has the superior strength and flexibility characteristics required to handle petroleum fluids under high pressures and to resist the high tension and bending stresses developed during the pipelaying process.

Figure 5:
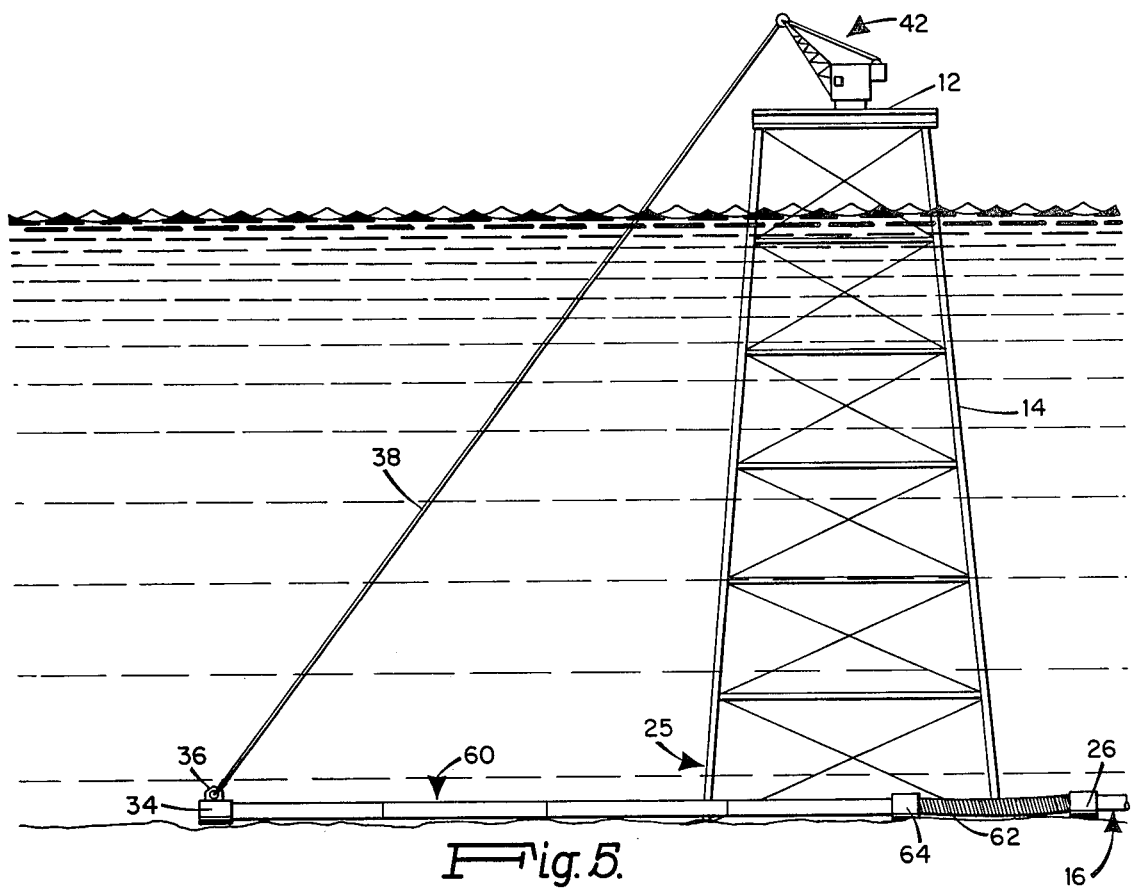
FIG. 5 is a perspective view of an alternative pipeline-riser combination just prior to raising the riser portion to a vertical orientation according to one embodiment of the invention.

Referring to FIG. 5, in an alternate embodiment of the invention the flexible riser member is replaced by a combination of a rigid member 60 and a short flexible member 62. Rigid member 60 and flexible member 62 are connected by a fluid-tight coupling 64. According to the alternative method, after the flexible member 62 is coupled to pipeline 16 by connection 26, a short length of flexible member 62 is payed out. The member 62 is then terminated and a rigid pipeline section is connected to the terminated end by a coupling 64. Sufficient rigid pipeline is then payed out so that it will reach, when oriented vertically to the upper portion 12 above the water surface.

A plug 34 and connection device 36 are then preferably provided at the free end in the same manner as they were appended to flexible member 22. Thereafter, the combination of pipeline member 60 and flexible member 62 are treated in the same manner as described in connection with FIGS. 3 and 4.

It is important to bear in mind that flexible member 62 is provided at that location in the pipeline-riser combination wherein the combination bends. Thus, a sufficient length of the flexible member must be provided to accommodate substantially the entire bend to prevent deformation of the rigid pipeline members.

If desired, after the pipeline-riser combination of FIG. 5 is secured to the offshore apparatus, a rigid, preformed pipeline member (not shown) may be substituted for flexible member 62 using underwater habitat methods, for example.

UNOBVIOUSNESS AND ADVANTAGES OF THE CLAIMED INVENTION

As noted above, many other methods of riser installation have been suggested in the past. Each of those methods provides a substantially rigid flowline as the riser portion extends from substantially the water bottom to above the water surface. One early apparatus (Matthews, Jr. U.S. Pat. No. 3,219,119, issued Nov. 23, 1965) discloses the use of a flexible coupling or a flexible joint between two rigid flowlines, that is, between the riser and that pipeline portion that lies on the bottom of a body of water. As noted in Matthews, Jr., his apparatus involves the installation of the riser on the jacket prior to laying the pipeline. Thus, the prior art does not suggest, describe, or teach the laying in method of the present invention where the pipeline is laid prior to installing the riser portion.

The described and claimed invention advantageously provides a method of installing a riser in a laying in environment which requires minumum diver aid to either connect to the pipeline or to position the riser portion in an operational relation to the offshore apparatus. This advantageously reduces the time and cost of installation. In particular this minimizes the need for diver assistance, which is particularly helpful when the depth of the water is greater than 100-200 feet.

Another advantage of the claimed invention is the reduction in equipment required to properly position the riser. Further advantage arises because the required equipment is generally already available on the pipelaying vessel and on the offshore apparatus. Additional advantage is also obtained because the connection between the flexible pipeline member and the incoming pipeline is made above water and defects which may escape observation at or below 200 feet of water will more likely be found.

The claimed invention further advantageously does not require bending equipment as required by the prior art (see, e.g., Vincent, U.S. Pat. No. 3,531,941, issued Oct. 6, 1970; Hemphill et al., U.S. Pat. No. 3,546,889, issued Dec. 15, 1970; Neal U.S. Pat. No. 3,640,080, issued Feb. 8, 1972; Neal, U.S. Pat. No. 3,650,114, issued Mar. 21, 1972; Walker, U.S. Pat. No. 3,893,305, issued July 8, 1975); and consequently there is no concern about plastic deformation of rigid pipe during the bending process.

Although the invention has been described in connection with a preferred embodiment thereof, it will be appreciated by those skilled in the art that deletions, additions, substitutions, and other modifications may be made without departing from the spirit and scope of the invention as defined in the appended claims.

What is claimed is:

1. A method of providing a continuous fluid flow path from a relatively rigid pipeline laying along the bottom of a body of water to an above water surface connection on an offshore apparatus comprising the steps of laying said pipeline along the bottom of said body of water toward said offshore apparatus from a pipelaying vessel, terminating said pipeline at a point sufficient to reach approximately to said offshore apparatus at its supporting base, connecting to said pipeline at said terminated end, a flexible tubular pipeline member having sufficient strength to withstand the normal operating flow path conditions, continuing to lay said flexible member and the pipeline, terminating said flexible member at a length at least sufficient to reach said above water connectin on said apparatus from the connection with the pipeline on the bottom of the body of water, and connecting to a free end of said flexible member a connection means, whereby said flexible member can be drawn and secured to said offshore apparatus to provide a continous flow path between said connection and said pipeline.

2. The method of claim 1 wherein said flexible member has a length at least as long as the depth of said body of water, at said offshore apparatus.

3. The method of claim 2 further including the step of securing said flexible member to the offshore apparatus in a substantially vertical orientation.

4. The method of claim 2 further including the steps of laying said flexible member past said offshore apparatus whereby the pipeline and flexible member lie on the bottom of said body of water, and thereafter orienting said flexible member to a substantially vertical position by drawing in a cable at an above surface portion of said apparatus.

5. A method of providing a continous fluid flow path from a relatively rigid pipeline lying along the bottom of a body of water to an above water surface connection on an offshore apparatus comprising the steps of laying said pipeline along the bottom of said body of water toward said offshore aparatus from a pipelaying vessel, terminating said pipeline at a point sufficient to reach approximately to said offshore apparatus at its supporting base, connecting to said pipeline at said terminated end, a flexible tubular pipeline member having sufficient strength to withstand the normal operating flow path conditions, continuing to lay said flexible member and the pipeline of the bottom of said body of water, terminating said flexible member at a length sufficient to provide a bending zone from a horizontal direction to a vertical direction, connecting to said flexible member a rigid pipeline member, continuing to lay the combination of said rigid member, flexible member, and pipeline, terminating said rigid member at a length at least sufficient to reach said above water connection on said apparatus from the connection with said pipeline on the bottom of the body of water, and connecting to a free end of said rigid member a connection means, whereby said rigid member can be drawn and secured to said offshore apparatus to provide in combination with the flexible member, a continuous flow path between said connection and said pipeline.

6. The method of claim 5 further including the step of securing said rigid member to the offshore apparatus in a substantially vertical orientation.

7. The method of claim 5 further including the steps of laying said rigid member and flexible member past said offshore apparatus whereby the pipeline, flexible member, and rigid member lie on the bottom of said body of water, and thereafter orienting said rigid member to a substantially vertical position by drawing in a cable, connected to said connection means, at an above surface portion of said apparatus.

8. The method of claim 7 further including the step of substituting a preformed rigid pipeline member for said flexible member.

* * * * *